(12) United States Patent
Dworman

(10) Patent No.: US 7,287,332 B2
(45) Date of Patent: *Oct. 30, 2007

(54) AIRPLANE PILOT AID

(76) Inventor: Carl Dworman, 158 Fourth Ave., Bayshore, NY (US) 11706

( * ) Notice: Subject to any disclaimer, the term of this patent is extended or adjusted under 35 U.S.C. 154(b) by 107 days.

This patent is subject to a terminal disclaimer.

(21) Appl. No.: 11/226,146

(22) Filed: Sep. 14, 2005

(65) Prior Publication Data

US 2006/0177798 A1 Aug. 10, 2006

Related U.S. Application Data

(60) Provisional application No. 60/615,994, filed on Oct. 5, 2004.

(51) Int. Cl.
*G01C 21/20* (2006.01)
(52) U.S. Cl. .................... 33/1 SD; 33/431; 235/61 NV; 235/78 N
(58) Field of Classification Search ............... 33/1 SB, 33/1 SD, 431, 457; 235/78 N, 61 NV
See application file for complete search history.

(56) References Cited

U.S. PATENT DOCUMENTS

| | | | | |
|---|---|---|---|---|
| 2,007,986 A | * | 7/1935 | Sprague | 33/1 N |
| 2,485,674 A | * | 10/1949 | Suiter | 33/1 AA |
| 2,546,836 A | * | 3/1951 | Saloschin | 33/1 SD |
| 3,276,682 A | * | 10/1966 | Phelps | 235/61 NV |
| 3,721,007 A | * | 3/1973 | Banner | 33/1 SD |
| 4,152,835 A | * | 5/1979 | Powell | 33/1 SD |
| 5,553,387 A | * | 9/1996 | Newcomb | 33/1 SD |
| 6,167,627 B1 | * | 1/2001 | Wilder et al. | 33/1 SD |
| 6,950,731 B1 | * | 9/2005 | English | 701/16 |

* cited by examiner

*Primary Examiner*—Christopher W Fulton
(74) *Attorney, Agent, or Firm*—Salter & Michaelson

(57) ABSTRACT

A pilot aid that includes a sheet material having indicia thereon indicative of a plurality of predetermined flying parameters including at least wind velocity and direction. A plurality of indicia wheels are each separately mounted from the sheet material and each are associated with a different flying parameter. A plurality of windows are disposed on the sheet material, each positioned to overly a corresponding indicia wheel and each for observing one of a plurality of predetermined characteristics that define the flying parameter.

22 Claims, 13 Drawing Sheets

FIG. 13

AIRPLANE PILOT AID

RELATED APPLICATIONS

The present application claims priority to U.S. Provisional Application Ser. No. 60/615,994 filed on Oct. 5, 2004.

TECHNICAL FIELD

The present invention relates to a useful tool or device adapted to assist a pilot during take-off or landing. The invention also relates to a mechanical aid device that reduces the chance of pilot error while enhancing pilot situational awareness, thus leading to safer flying.

BACKGROUND

Pilots normally receive mandatory pre-recorded ATIS information via a discreet radio frequency or by telephone. For example, the Providence, R.I. ATIS information is available on frequency 124.2, and also is available by dialing the self-repeating recorded message on telephone number 401.737.3215.

The problem that arises is that the pilot must either remember or make written notes of the submitted information, which is not always easy to do, given the other necessary activities being performed by a pilot during landing and/or takeoff. Accordingly, it is an objective of the present invention to provide means in a durable, sheet-like format that enables the pilot to record the ATIS information in a chart-like format so that the information is memorialized on a case-by-case basis for ready review by the pilot.

SUMMARY OF THE INVENTION

In accordance with the present invention there is provided a mechanical chart-like device that is designed to aid the airplane pilot in remembering and presenting a situational awareness, via a visual format, of the mandatory pre-takeoff and pre-landing Airport Traffic Information Service (ATIS) that is promulgated in a self-repeating, pre-recorded announcement which is prepared and changed on an hourly basis, or sooner on a "need be" basis, by personnel in the airport control tower.

In accordance with the present invention there is provided a pilot aid that includes a sheet material having indicia thereon indicative of a plurality of predetermined flying parameters including at least wind velocity and direction, a plurality of indicia wheels each separately mounted from the sheet material and each associated with a different flying parameter and a plurality of windows on the sheet material, each positioned to overly a corresponding indicia wheel and each for observing one of a plurality of predetermined characteristics that define the flying parameter.

In accordance with other aspects of the present invention the pilot aid may display flying parameters that include, but are not limited to, visibility, ceiling, field elevation, barometric pressure and temperature. The sheet material of the pilot aid may be double layered, may have each wheel disposed between layers, may have multiple sides and a portion of each wheel may extend beyond a side so as to be accessible to a user. The indicia wheel for wind direction is preferably of larger diameter than the other indicia wheels and comprises a pair of concentrically disposed rotatable wheels. The pilot aid may further include a fixed position wheel between the pair of concentric wheels and having a window for observing indicia indicative of runway number disposed on the larger diameter wheel. One of the concentric wheels may provide compass nomenclature and the other of the concentric wheels may comprise a pointable hand indicating wind direction. The wheel that carries compass nomenclature may be larger in diameter than the fixed position wheel and the fixed position wheel may be larger in diameter than the pointable hand. The pilot aid may further include a plurality of dial members, each disposed over an indicia wheel and including a hand that can be pointed to nomenclature on the sheet material. The dial members are preferably transparent so nomenclature on the sheet material can be read.

In accordance with other embodiments of the present invention the pilot aid includes a sheet material having indicia thereon indicative of a plurality of predetermined flying parameters including at least wind velocity and direction, a plurality of indicia wheels each separately mounted from the sheet material and each associated with a different flying parameter and a plurality of dial members, each disposed over an indicia wheel and including a hand that can be pointed to nomenclature on the sheet material.

In accordance with still other aspects of the present invention the pilot aid includes a plurality of windows on the sheet material, each positioned to overly a corresponding indicia wheel and each for observing one of a plurality of predetermined characteristics that define the flying parameter. The dial members may be transparent so that the nomenclature on the sheet material can be read. The nomenclature may include several categories. The indicia wheel and dial member are preferably concentrically supported for rotation. The indicia wheel and dial member may be supported by a rivet means. The pilot aid may include a pair of windows associated with one indicia wheel.

In accordance with a further embodiment of the present invention there is provided a pilot aid that includes a sheet material having indicia thereon indicative of a plurality of predetermined flying parameters including at least wind velocity and direction and a plurality of indicia wheel means each separately mounted from the sheet material and each associated with a different flying parameter. One of the indicia wheel means preferably comprises a pair of concentrically disposed wheels.

In accordance with further aspects of the present invention the pilot aid may further include a fixed position wheel between the pair of concentric wheels and having a window indicia indicative of runway number. One of the concentric wheels may provide compass nomenclature and the other of the concentric wheels may comprise a pointable hand indicating wind direction. The wheel that carries compass nomenclature is preferably larger in diameter than the fixed position wheel and the fixed position wheel is preferably larger in diameter than the pointable hand. The pilot aid may also include a plurality of windows on the sheet material, each positioned to overly a corresponding indicia wheel and each for observing one of a plurality of predetermined characteristics that define the flying parameter. The pilot aid may also include a plurality of dial members, each disposed over an indicia wheel and preferably including a hand that can be pointed to nomenclature on the sheet material.

DESCRIPTION OF THE DRAWINGS

Numerous other objects, features and advantages of the present invention should now become apparent upon a reading of the following detailed description taken in conjunction with the accompanying drawings, in which:

FIG. 13 is a rear view of the pilot aid.

DETAILED DESCRIPTION

Figure 1:
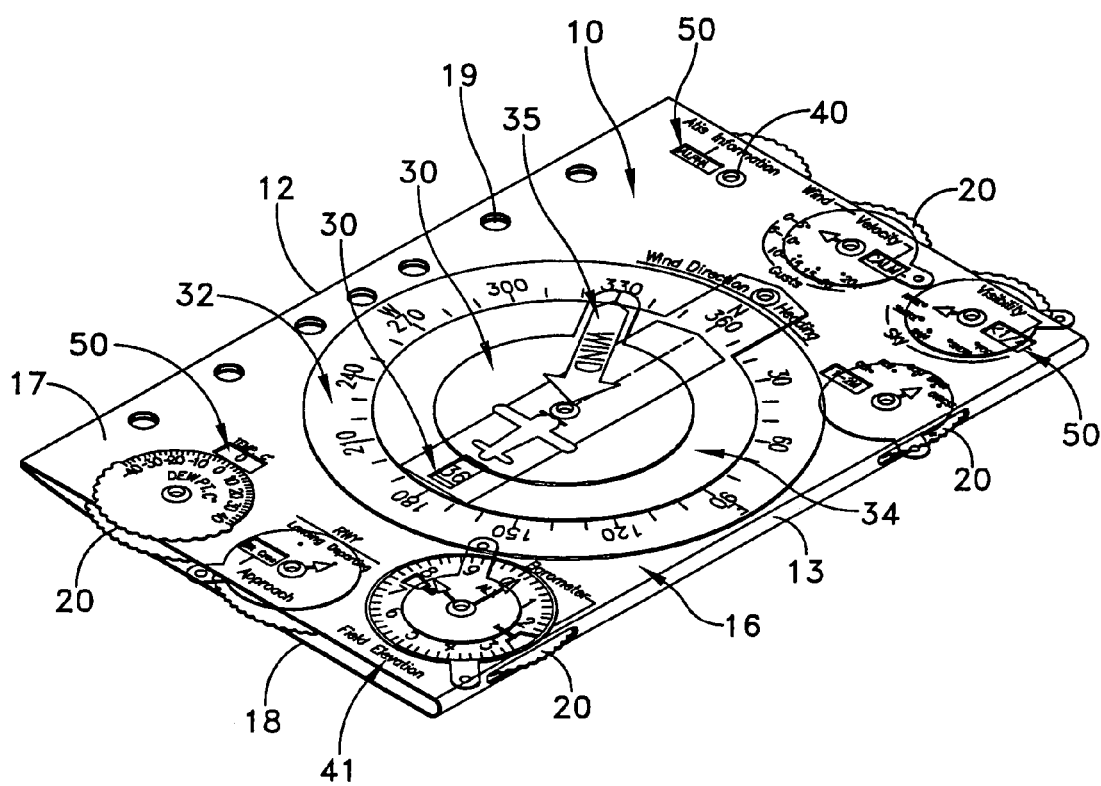
FIG. 1 is a perspective view of a preferred embodiment of the pilot aid of the present invention.

FIG. 1 is an illustration of one embodiment of the instant invention, identified by the term "ATIS Wheel". The device shown in FIG. 1 comprises a rectangular sheet 10 of any suitable structural material, such as plastic or cardboard, having seven individual 1.5" diameter wheels 20 positioned about the perimeter of the device along with two superimposed concentric center wheels 30, 32, one of which, namely wheel 32, is turnable to indicate the wind direction, while the other of which, namely wheel 30, is turnable to show the proper runway number in the opening or window 33 located at approximately 6 o'clock. Thus, in FIG. 1 the wind direction is indicated at 330° N.W., while the runway is number "36". Each of the smaller seven wheels 20 also coincide with a category of information which is presented in the airport's ATIS broadcast. Each wheel offers the pilot the opportunity to choose the specific information that is offered in each category in the ATIS broadcast, and to then dial and display the specific information in each individual category wheel display window 50. Once the appropriate information is entered into the various wheels, this displayed information is now available to the pilot for continued reference without the possibility of transcription error. It is recommended that the pilot listen to the pre-recorded ATIS information twice to verify that the correct information has been entered into the various wheels and dials.

The ATIS information is presented in an organized format, providing the pilot with the ATIS information in the following specific order:

1. The ATIS information phonetic letter identifying this specific ATIS report, named sequentially after a phonetic letter of the alphabet. For example, in FIG. 2 this is Providence R.I. ATIS information "ALPHA". See further details in FIG. 6 relating to wheel 20A. The time the ATIS information is recorded may be in ZULU (GMT) time, although inasmuch as all information should be current, there is no wheel to record the ZULU time. Note that wheel 20A in FIG. 2 has been rotated to display "ALPHA" in the viewing window 50.
2. The direction from which the wind is blowing, and as already stated, the wheel 32 that carries the "wind" arrow or hand 35 is rotated to align with the proper wind direction registered on the wheel 30.
3. The velocity of the wind, and wind gusts if any, is noted by wheel 20B in FIG. 7. The data on wind wheel 20B is shown in FIG. 7 so that the proper wind velocity, or the word "calm", may appear in the viewing window 50B. A movable arrow or hand 14 is provided to register the intensity of any wind gusts that may be present.
4. The visibility and sky condition which are shown on wheel 16. Specifically, the wheel is turned to show the extent of visibility in the viewing window, while the arrow or hand 18 is moved to indicate the appropriate sky and/or weather condition.
5. The ceiling of the sky (if any) and cloud height, if conditions are overcast, are indicated by appropriate movement of wheel 20 and arrow or hand 22.
6. The temperature and dew point are recorded by appropriate movement of wheel 24.
7. The runway in use for landing and takeoff is recorded by appropriate movement of centrally located wheel 26 (FIG. 3) so that the proper runway number appears in the window 28 in FIG. 1.
8. The instrument approach in use for landing is recorded by appropriate movement of wheel 30.
9. The barometric pressure, in order to calibrate the altimeter, is recorded by turning wheel 32 so that the proper barometric pressure is viewable through the window. Movement of the hands mounted over wheel 32 provides means for recording the airport field elevation, which is very critical information for instrument approaches, even though it is information that is not provided by the ATIS broadcast. For example, in FIG. 1, the hands have been set to indicate a field elevation of 800 feet.

Unique to the instant invention is that the pilot has now all the ATIS broadcast information on display in a clear and easily readable format without the need for transcribing the information. Of special importance is the fact that the instant invention displays clearly the visual relationship between the wind direction and the active runway, informing the pilot as to the pending crosswind takeoff and landing situation.

Although not illustrated, the instant invention may also be used to display the recorded airport weather information promulgated by radio and telephone on the AWOS (Automated Weather Information Service) and ASOS (Automatic Surface Observation Service) offered at uncontrolled airports. Also, the backside of the rectangular sheet shown in FIG. 1 may have a useful pictorial summary display of important airport signs and markings, plus a pictorial display of ATCT Light Gun Signals as per the FAA Aeronautical Information Manual (AIM). It should also be noted that the rectangular sheet which forms the base for the various wheels hereinbefore described may have seven punched holes on its left side, making it conveniently compatible with Jeppesen™ or similar flight binders.

Figure 2:
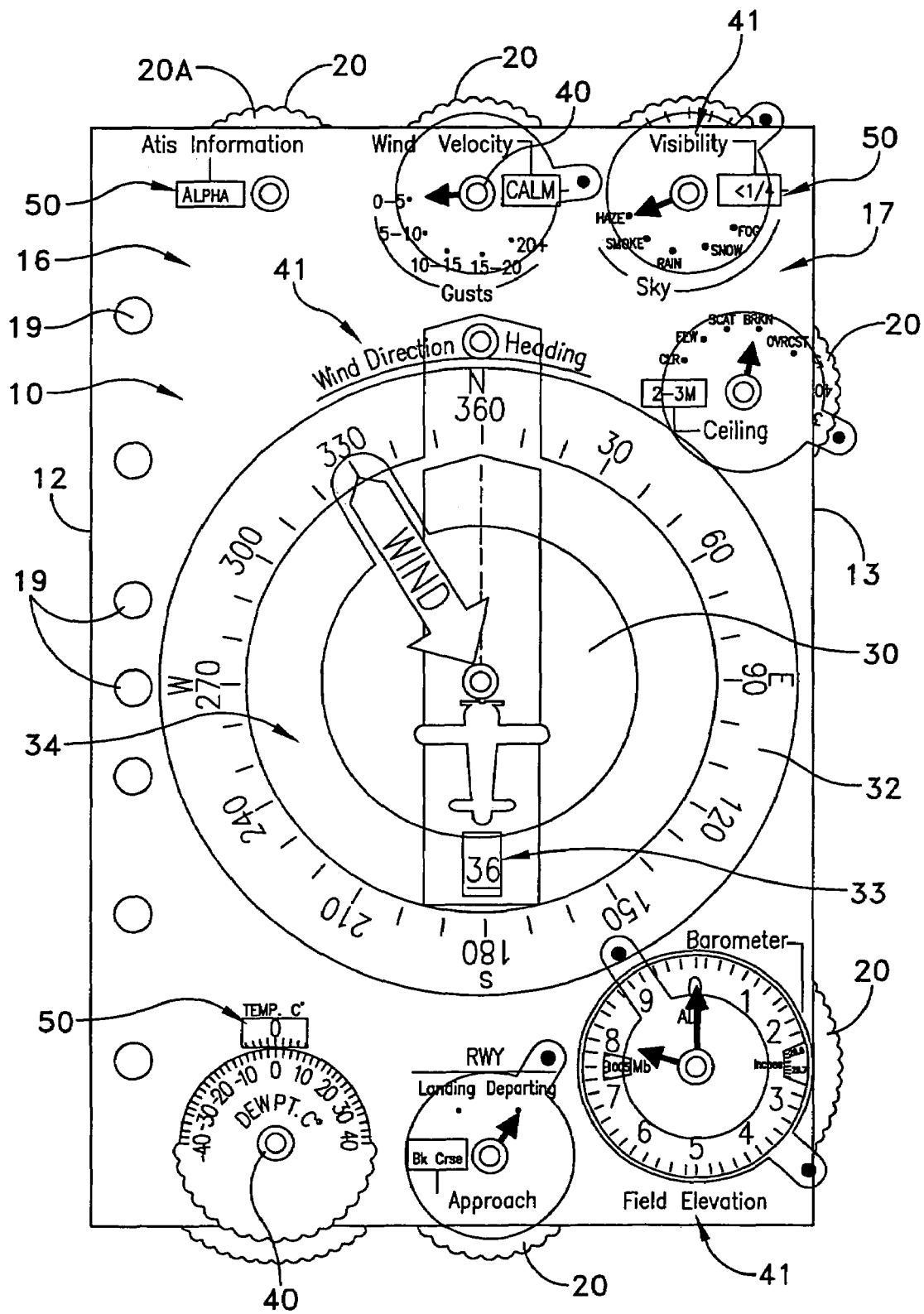
FIG. 2 is a front view of the pilot aid of FIG. 1.

FIGS. 1 and 2 illustrate the pilot aid 10 of the present invention, showing the various wheels and dials that are used to designate certain flying parameters. Each of the wheels and dials are supported by means of a pivot, such as the illustrated rivet 40. Other means may also be provided for forming a pivot, although, the use of a rivet is preferred as this is a simple means for enabling support of each of the wheels and dials and at the same time enabling ready rotation thereof.

The main support structure for the pilot aid is in the form of sheet material having indicia thereon. For example, in FIG. 1 refer to the indicia 41 on the sheet material indicating "Field Elevation." Also, at the top of the pilot aid there is other indicia such as "Wind Velocity."

The supporting sheet material 16 may be in the form of a relatively rigid cardboard material or could also be constructed of a plastic material. The sheet material is essentially double layered, such as is illustrated in the cross-sectional view of FIG. 5 having a top layer 17 and a bottom layer 18. These layers may be considered as joined at respective side edges 12 and 13 (see FIG. 2). The layers 17 and 18 may be two separate layers or a single piece of sheet material may be used folded at edge 13 and joined at edge 12. Opposite ends of the sheet material are open as illustrated in FIG. 1 to accommodate wheels. Also, at edge 13 there are provided slots in which wheels 20 are partially disposed. The sheet material 16 is also provided with a series of punched holes 19 for facilitating the mounting of the pilot aid in a notebook or the like. The holes 19 are disposed along a linear path adjacent to the edge 12 that is illustrated in FIGS. 1 and 2.

Figure 3:
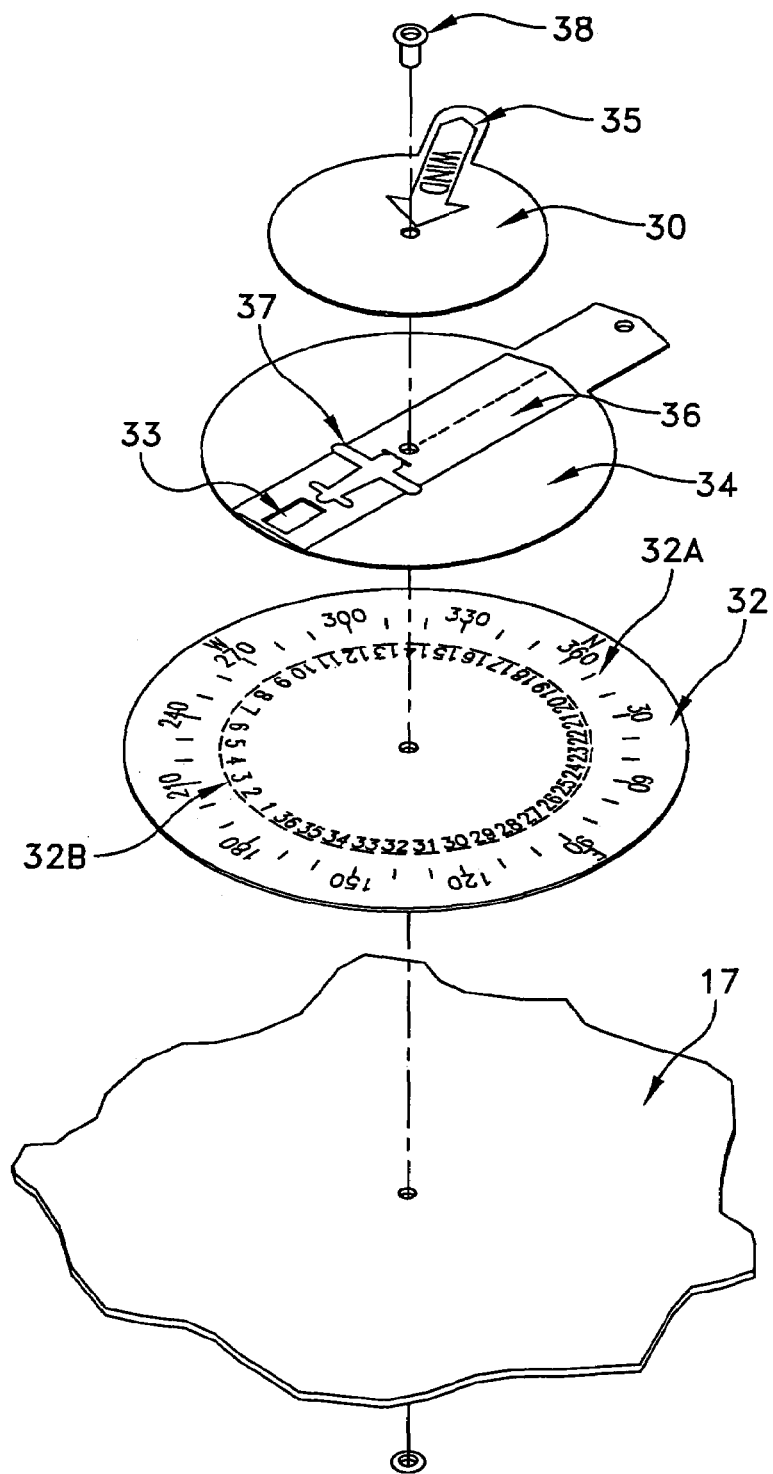
FIG. 3 is an exploded perspective view of the wheel members indicating wind direction and runway number.
Figure 4:
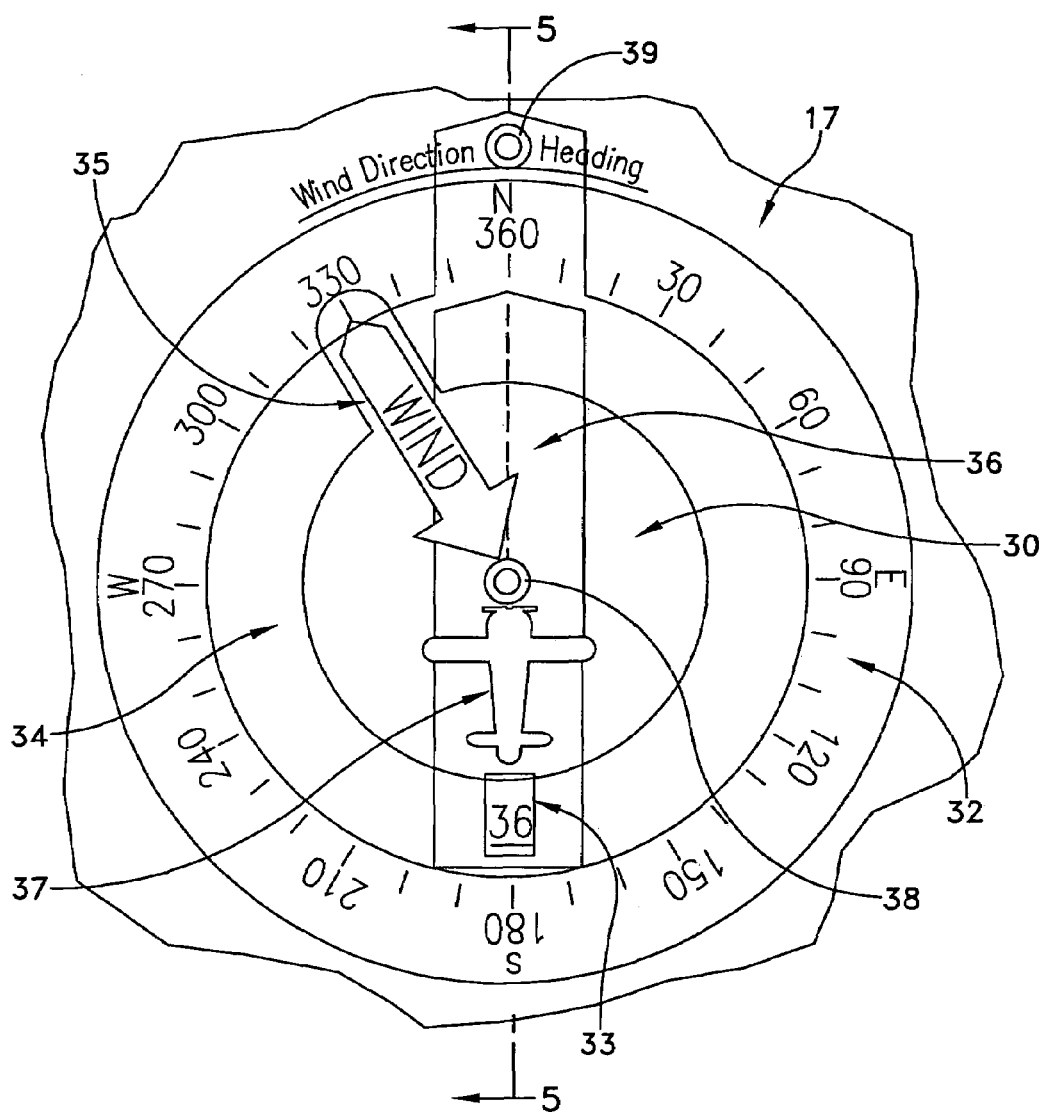
FIG. 4 is a front view of the wheel members of FIG. 3.

In the pilot aid 10, in the larger center area of the sheet material is disposed the wheels 32 and 34 as well as the dial 30. These wheels are generally of larger diameter than the other wheels 20 disposed about the periphery of the sheet material. Of the wheels 32 and 34, the wheel 32 is rotatable and the wheel 34 is fixed in position. FIG. 3 is an exploded perspective view showing the various wheel and dial components. The center dial 30 is turnable or rotatable to indicate wind direction by means of the wind arrow 35. The wheel 32 is also turnable or rotatable to display the proper runway number in the window 33 located at approximately 6 o'clock.

Figure 5:
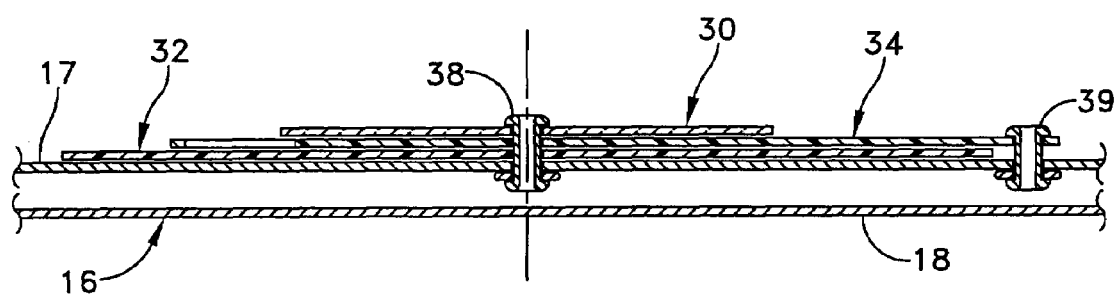
FIG. 5 is a cross-sectional view taken along line 5-5 of FIG. 4 indicating the structure of the pilot aid.

With further reference to FIGS. 2-5, it is noted that the fixed wheel 34, in addition to including or defining the window 33, further includes a runway marking 36 and a simulated airplane 37. In FIG. 3 the wheels and dial are rotatably supported by means of the rivet 38 which engages these components as well as the top layer 17. As indicated previously, the wheel 34 is fixed in position and thus is not rotatable even though it is supported by the rivet 38. This is fixed in position primarily by the use of a second rivet 39, as illustrated in FIG. 5, that prevents the rotation of the wheel 34. The rotatable wheel 32 carries a first track 32A that designates a compass bearing from degrees 0 to 360. The track 32A also carries the nomenclature of the compass directions. Wheel 32 also is formed with an inner track 32B that sets forth the runway number from 1 to 36. It is the runway number that is displayed in the window 33.

In FIG. 2 it is noted that the wind direction, indicated by the arrow 35, is pointing to a bearing of 330 degrees NW. At the same time, now through the window 33, is a display of the runway number, namely runway "36." This corresponds to a landing or take off direction of "North." FIG. 2 also illustrates by indicia 41 on the sheet material the "wind direction and heading." This indicia may be printed directly upon the top layer of the sheet material.

Reference is now made to FIGS. 6-12 which are respective exploded perspective views illustrating the various other control wheels that are used for setting flying parameters. Each of these wheels is basically disposed between the layers of the sheet material and each of the wheels extends partially beyond an edge of the sheet material either at the top, bottom or a side. On the side, apertures may be provided so that the wheels can extend therethrough such as is illustrated, for example, in FIGS. 9 and 10.

Figure 6:
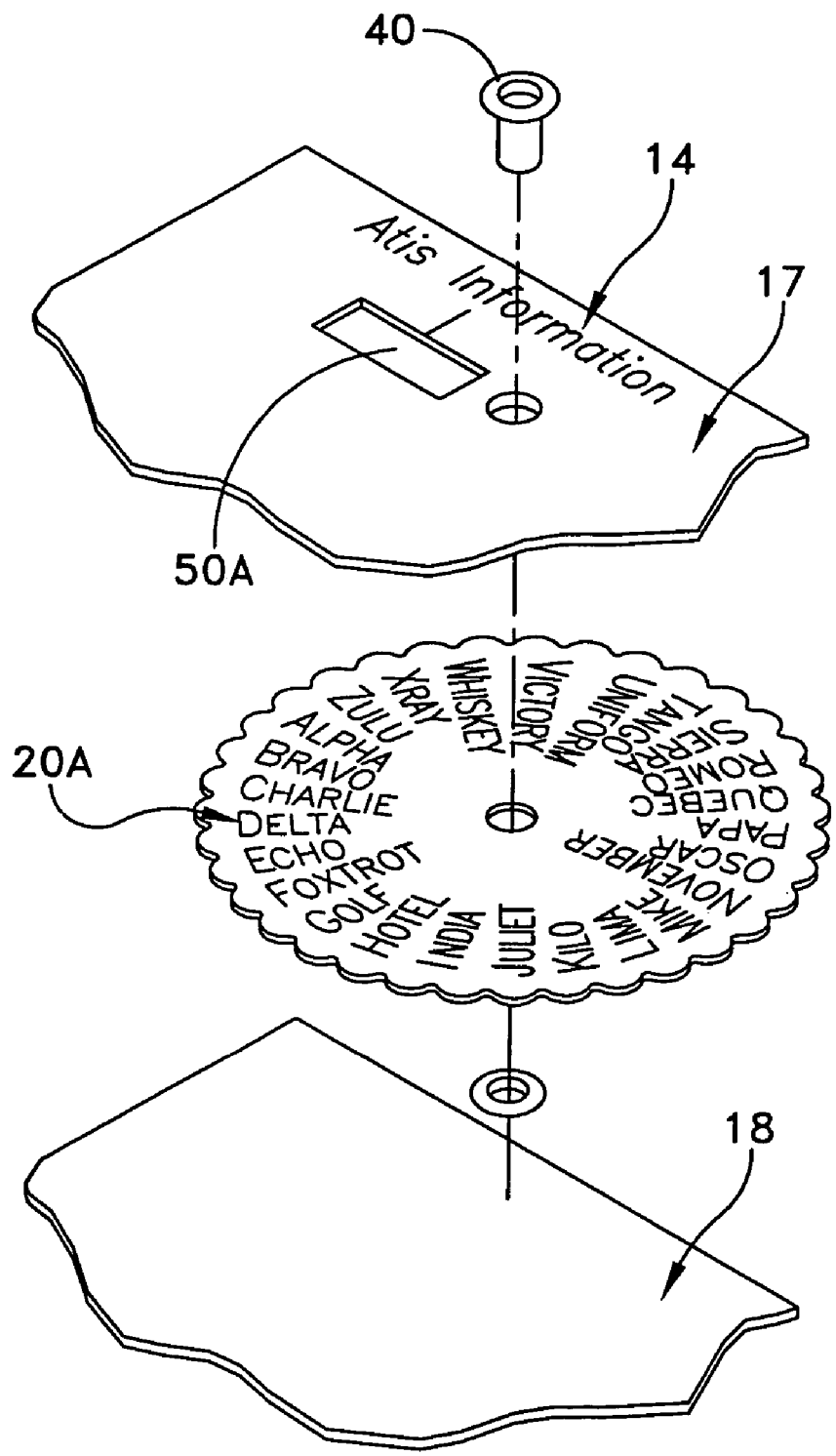
FIG. 6 is an exploded perspective view of the "Atis Information" wheel.
Figure 7:
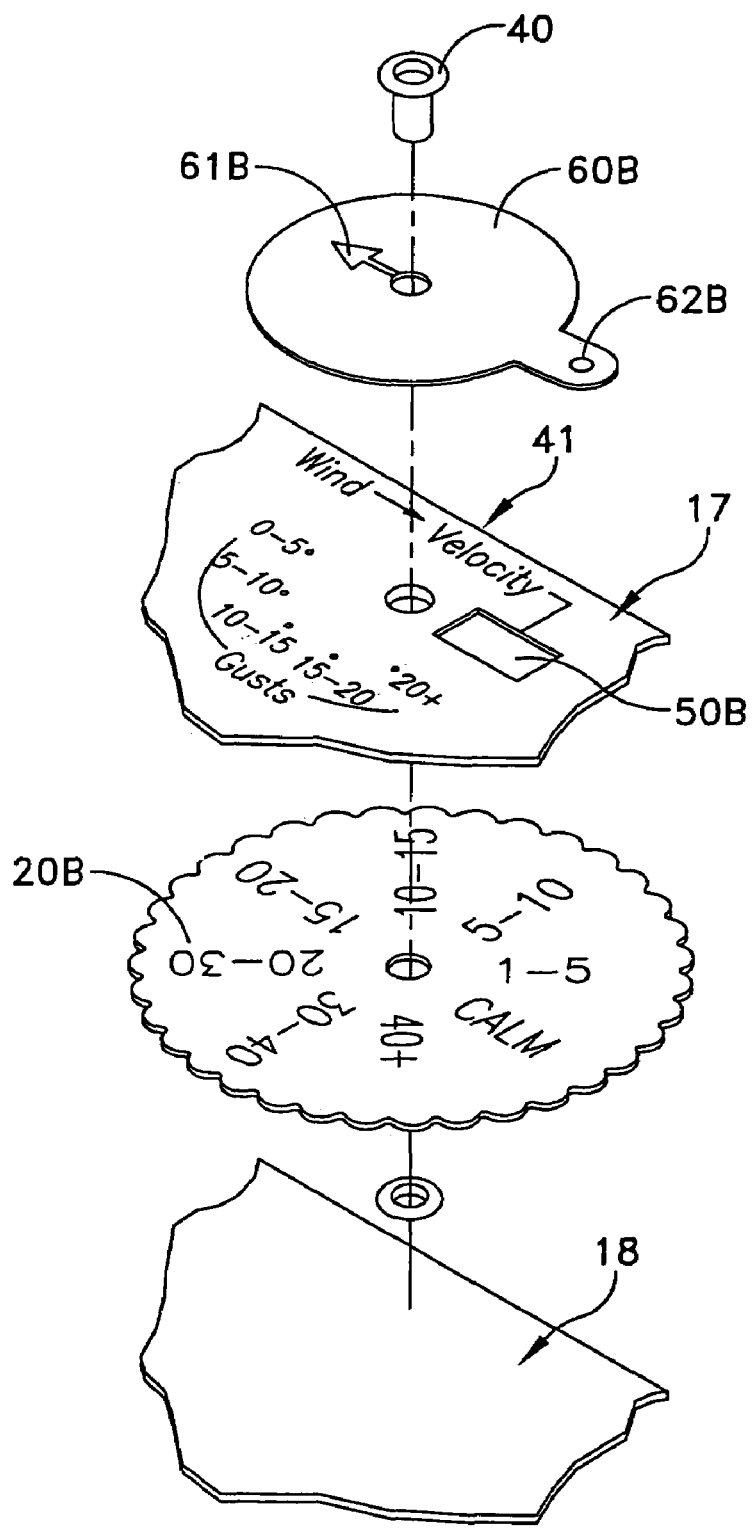
FIG. 7 is an exploded perspective view of the "Wind Velocity" wheel and dial.

FIG. 6 is an exploded perspective view showing the components that are used to indicate one flying parameter. This is the ATIS information as indicated by the indicia on layer 17. Layer 17 is also provided with a window 50A through which the nomenclature on the wheel 20A is displayed. The ATIS information phonetic letter identifies the specific ATIS report. On the wheel 20A there is illustrated the associated description for each of the alphabetic letters. Of course, other words can be used than those specifically set forth on wheel 20A in FIG. 6.

FIG. 7 is an exploded perspective view illustrating another of the flying parameters. FIG. 7 illustrates wind velocity by means of the wheel 20B and the associated dial 60B points to "gusts." Dial 60B has an extension 62B that assists in its rotation and an arrow or pointer 61B. The dial 60B is preferably transparent so that the indicia relating to wind gusts can be observed. This indicia is printed on the top layer 17. The wind velocity is observed through the window 50B in the layer 17. The rotatable wheel 20B carries a number of different wind velocity ranges from "calm" up to "40+." FIG. 7 illustrates the specific wind velocity ranges, although, other ranges can be printed on the wheel 20B.

Figure 8:
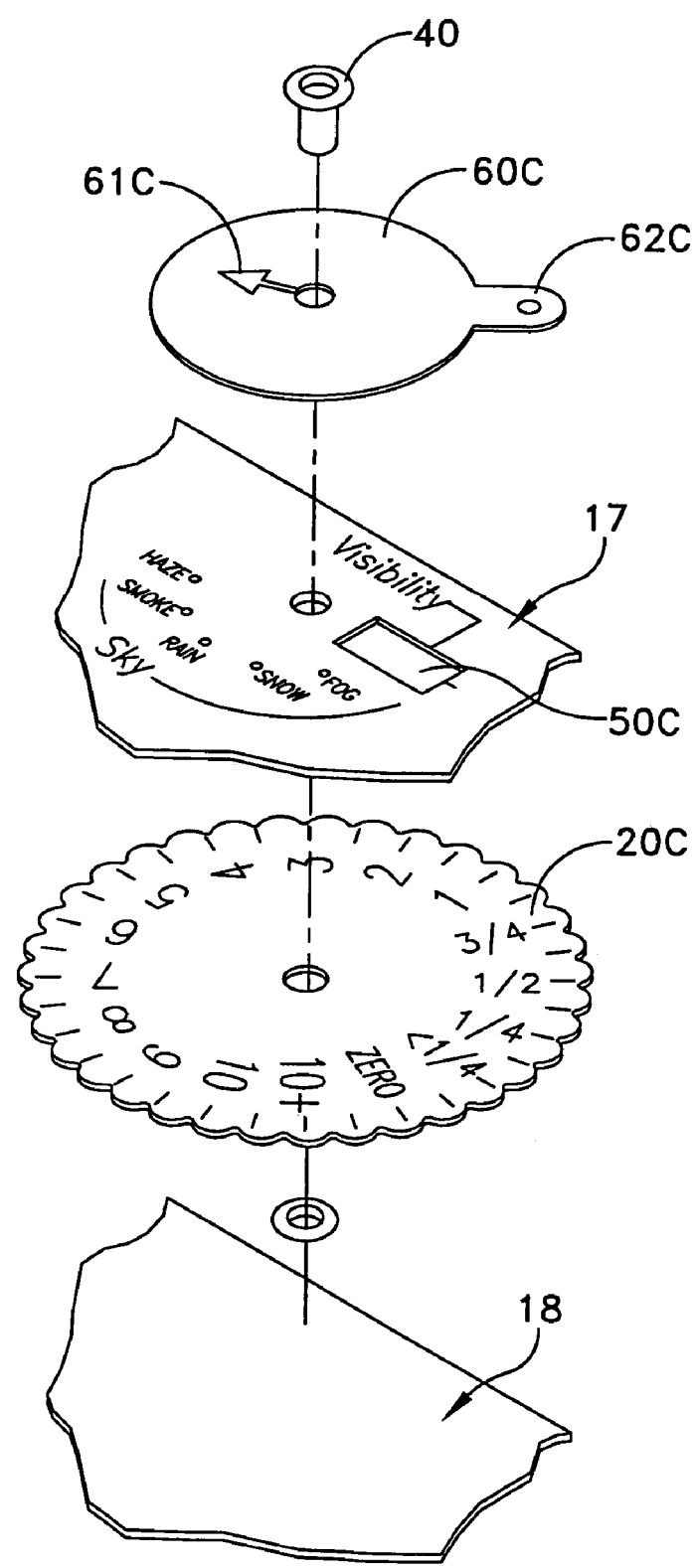
FIG. 8 is an exploded perspective view of the "Visibility" wheel and dial.

FIG. 8 is an exploded perspective view that illustrates the "visibility" parameter. FIG. 8 illustrates the wheel 20C that may be rotated to illustrate visibilities from 0 to greater than 10 miles. This is shown in fractional and integer increments on the wheel 20C. This indicia on the wheel 20C may be printed thereon. On top of the layer 17 is also provided the transparent dial 60C with its associated arrow 61C that is used as a hand or pointer, and extension 62C. This may be pointed to any one of the five conditions relating to the "sky" condition taken from the report. The dial 60C can be rotated with the assistance of the rotation extension 62C so that the hand or arrow 61 C can point to any one of the conditions shown.

Figure 9:
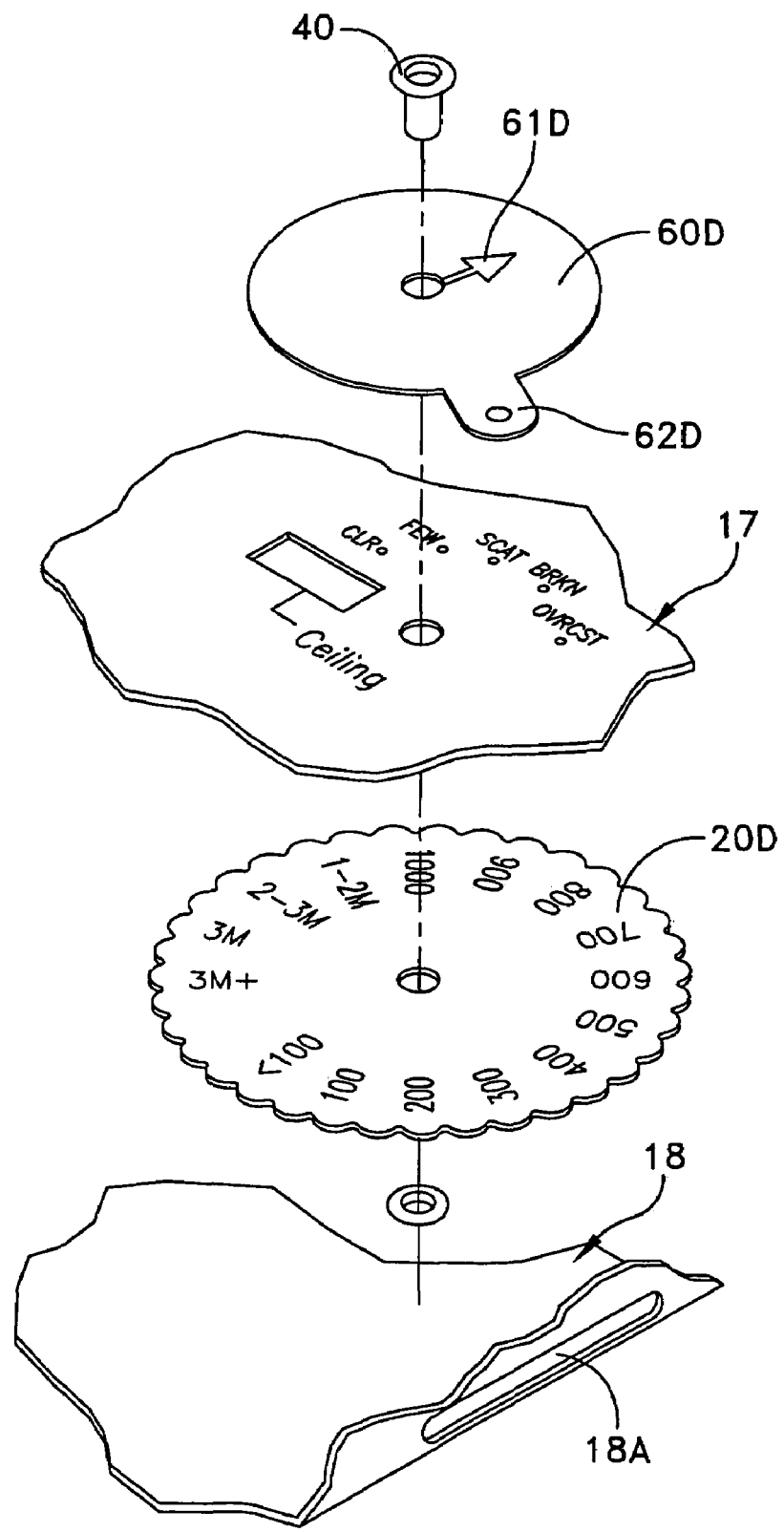
FIG. 9 is an exploded perspective view of the "Ceiling" wheel and dial.

FIG. 9 is an exploded perspective view showing another flying parameter. In FIG. 9 there is an illustration of "ceiling." On the layer 17 of the sheet material there are provided indicia designations from overcast to clear. These may be printed on the layer 17. The transparent dial 60D includes an arrow or hand 61D that may be pointed to any one of the conditions indicated by indicia on the layer 17. The transparent dial 60D may be provided with an extension 62D to assist in manually rotating the dial 60D. Between the layers 17 and 18 is disposed the wheel 20D. The wheel 20D may extend partially through the side aperture 18A so that the wheel can be rotated by the user. The indicia on the wheel 20D indicates different levels of "ceiling." The range is illustrated on wheel 20D from less than 100 feet up to greater than 3 miles.

Figure 10:
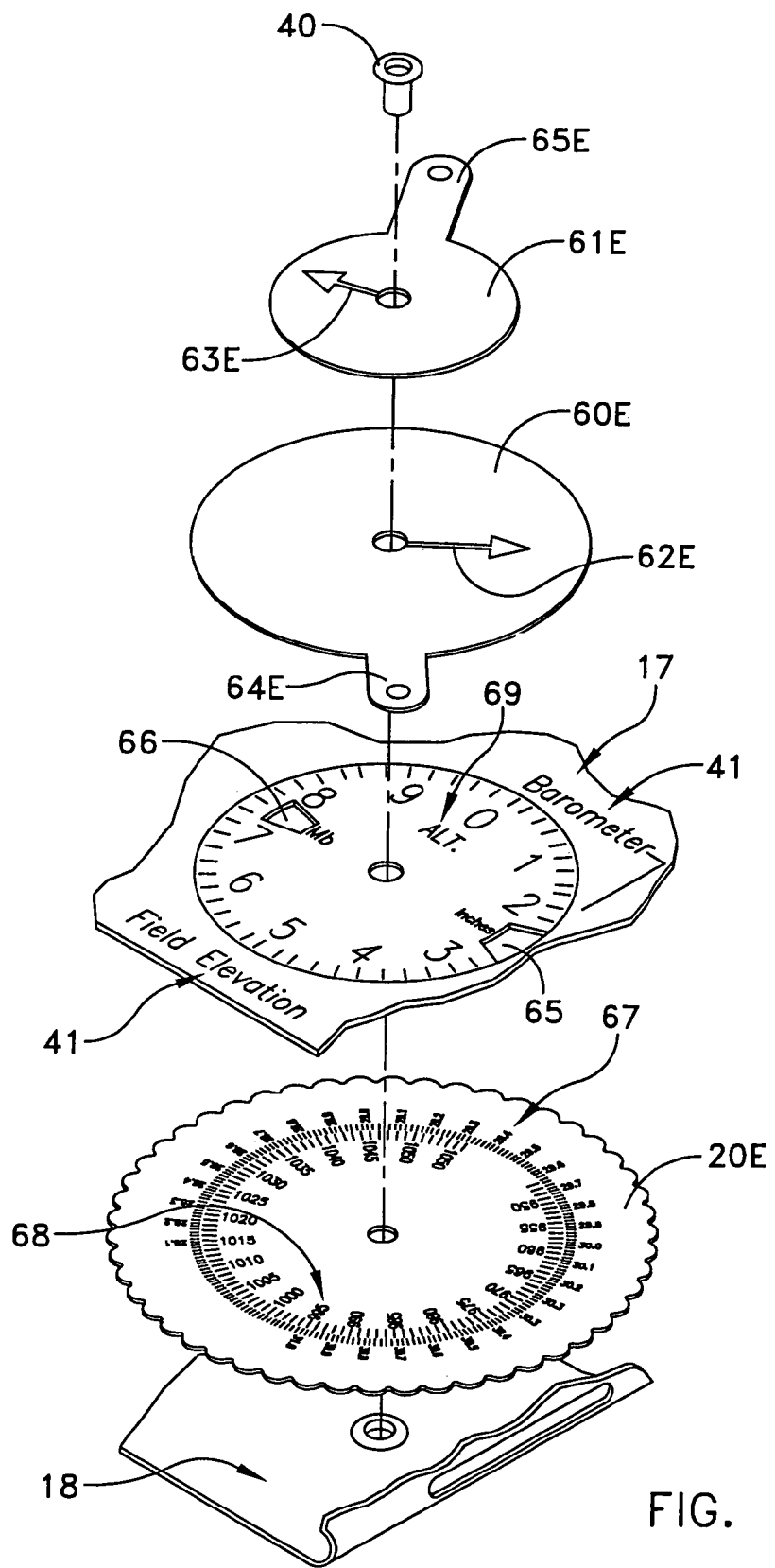
FIG. 10 is an exploded perspective view of the "Field Elevation" and "Barometer" wheel and associated dials.

FIG. 10 is an exploded perspective view of a flying parameter that indicates both the barometric pressure and the field elevation. These factors are illustrated by indicia printed directly on the layer 17. In addition, on the layer 17 is a circular indicia of elevation or altitude. At the 3 o'clock and 9 o'clock positions of this indicia, there are respective windows 65 and 66 for displaying therethrough barometric pressures in respective inches or millibars. In FIG. 10 the wheel 20E is rotatable and has a pair of tracks including an outer track 67 and an inner track 68. The track 67 is demarcated in inches of mercury for barometric pressure. The inner track 68 is designated in millibars. The outer track 67 aligns with window 65 while the inner track 68 aligns with window 66. In this regard, it is noted that the windows 65 and 66 are positioned different distances from the center of the circular indicia 69.

In FIG. 10 there are provided a pair of concentric dials 60E and 61E, each having respective hands or arrows 62E and 63E. The arrow 62E is longer than the arrow 63E. Each of the dials 60E and 61E may also be provided with a respective extension 64E and 65E for assisting in rotating these dials. The user can align the respective arrows 62E and 63E with the integer numbers on the circular indicia 69. The integer numbers thereon are intended to be expressed in hundred feet or thousand feet designations.

Figure 11:
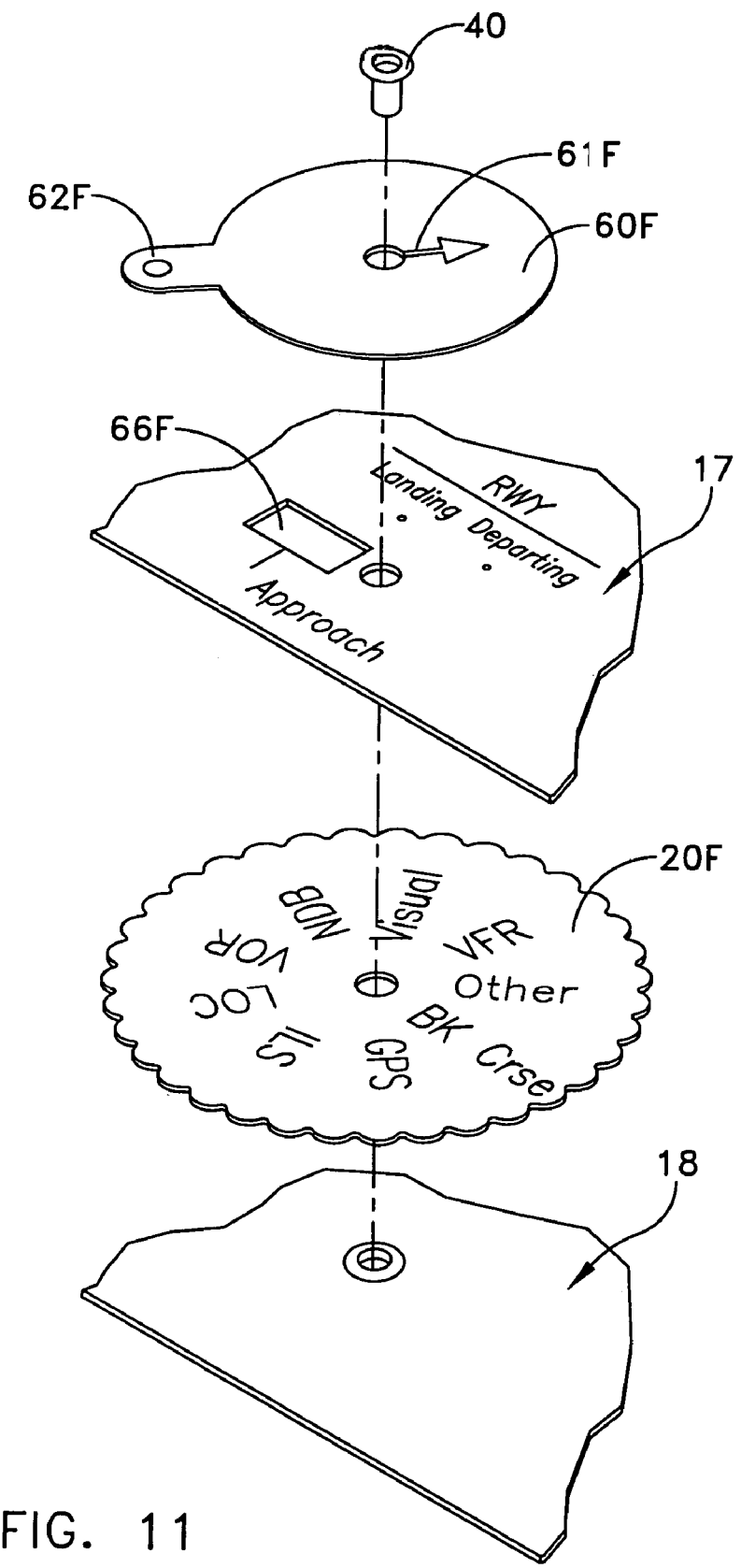
FIG. 11 is an exploded perspective view of the "Approach" wheel and dial.

FIG. 11 is an exploded perspective view illustrating the instrument approach that is used for landing or departing. Indicia on the layer 17 is printed and indicates the landing and departing positions. The transparent dial 60F has a hand 61F that may be controlled from the extension 62F to point the hand or arrow to indicate either a "landing" or a "departing" position. The extension 62F facilitates the rotation of the dial 60F. Because the dial 60F is transparent the indicia that is under it is readily readable.

In FIG. 11 the wheel 20F has indicia or nomenclature thereon that is viewable through the window 66F. This indicia on the wheel 20F indicates certain landing and departing conditions specifically set forth in FIG. 11.

Figure 12:
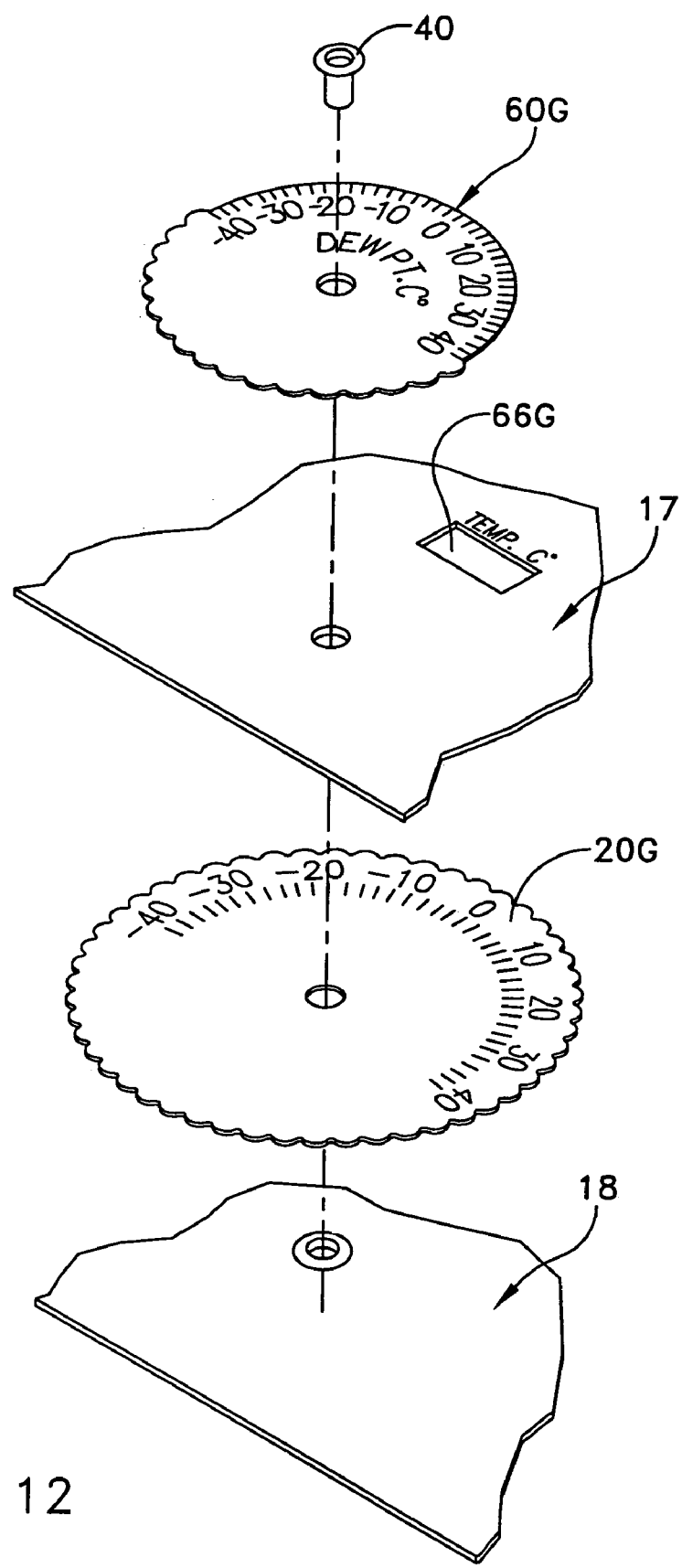
FIG. 12 is an exploded perspective view of the "Temperature" wheel and dial.

FIG. 12 is an exploded perspective view illustrating flying parameters relative to temperature. This display uses a pair of wheels 20G and 60G, one for indicating temperature in degrees C and the other for indicating dew point temperature. The wheel 20G indicates outside air temperature while the wheel 60G indicates dew point. These temperatures and dew points are set forth on printed indicia on each of the respective wheels 20G and 60G in FIG. 12. It is the temperature indicia on the wheel 20G that is illustrated through the window 66G.

Figure 13:
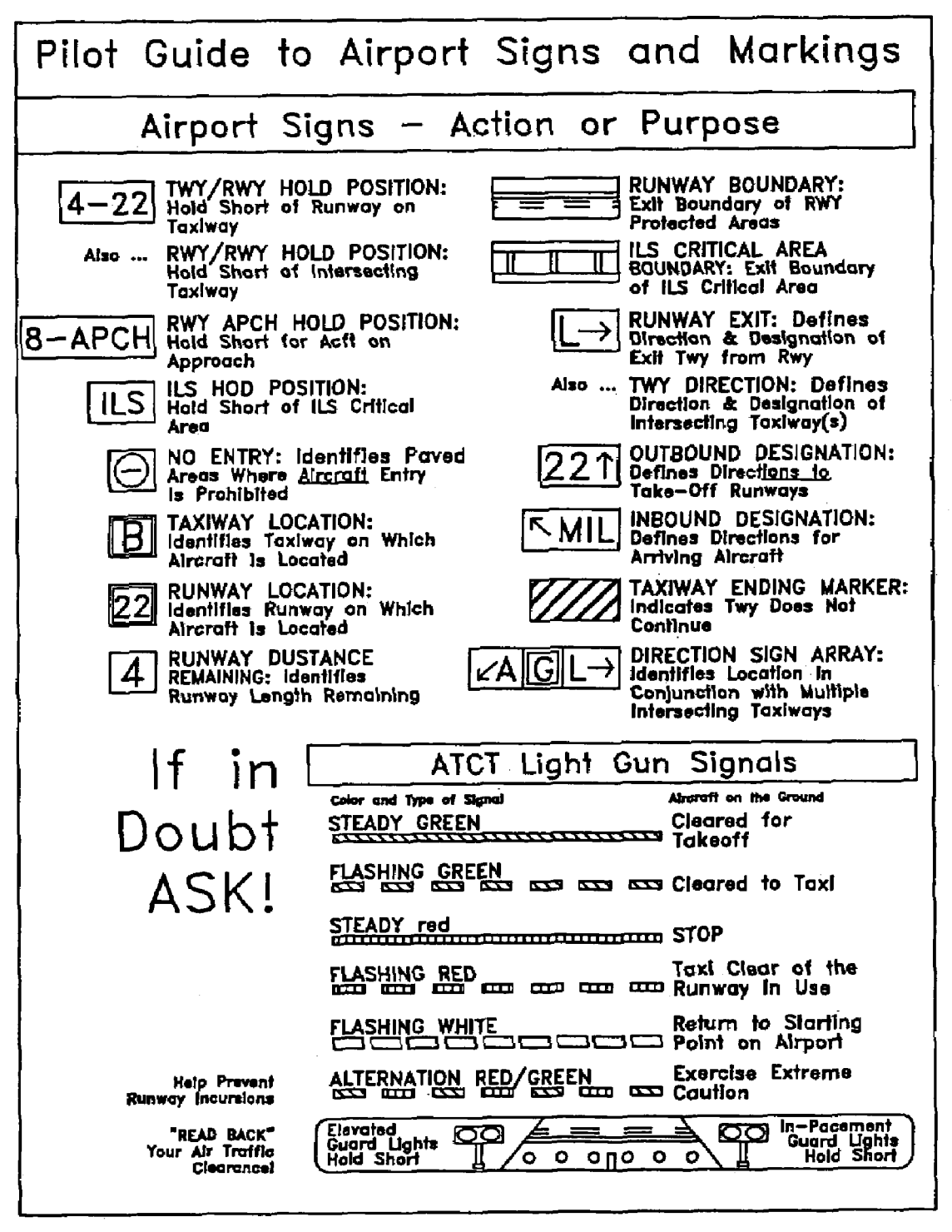

FIG. 13 illustrates indicia that is preferably used on the back surface of the pilot aid.

While this disclosure has been particularly shown and described with references to preferred embodiments thereof, it will be understood by those skilled in the art that various changes in form and details may be made therein without departing from the spirit and scope of the disclosure as defined by the appended claims.

What is claimed is:

1. A pilot aid comprising:
   a sheet material having indicia thereon indicative of a plurality of predetermined flying parameters including at least wind velocity and direction;
   a plurality of indicia wheels each separately mounted from said sheet material and each associated with a different flying parameter;
   a plurality of windows on said sheet material, each positioned to overly a corresponding indicia wheel and each for observing one of a plurality of predetermined characteristics that define the flying parameter;
   wherein one of the indicia wheels comprises a pair of concentrically disposed wheels;
   further including a fixed position wheel between and concentric with the pair of concentric wheels and having a window for observing one of said plurality of predetermined flying parameters.

2. The pilot aid of claim 1 the flying parameters also include visibility, ceiling, field elevation, barometric pressure and temperature.

3. The pilot aid of claim 1 wherein the sheet material is double layered, has each wheel disposed between layers, has multiple sides and a portion of each wheel extends beyond a side so as to be accessible to a user.

4. The pilot aid of claim 1 wherein the indicia wheel for wind direction is of larger diameter than the other indicia wheels and comprises a pair of concentrically disposed rotatable wheels.

5. The pilot aid of claim 1 further including a plurality of dial members, each disposed over an indicia wheel and including a hand that can be pointed to nomenclature on the sheet material.

6. The pilot aid of claim 5 wherein the dial members are transparent.

7. A pilot aid comprising:
   a sheet material having indicia thereon indicative of a plurality of predetermined flying parameters including at least wind velocity and direction;
   a plurality of indicia wheels each separately mounted from said sheet material and each associated with a different flying parameter;
   a plurality of windows on said sheet material, each positioned to overly a corresponding indicia wheel and each for observing one of a plurality of predetermined characteristics that define the flying parameter.
   wherein the indicia wheel for wind direction is of larger diameter than the other indicia wheels and comprises a pair of concentrically disposed rotatable wheels; and
   further including a fixed position wheel between the pair of concentric wheels and having a window for observing indicia of runway number disposed on the larger diameter wheel.

8. The pilot aid of claim 7 wherein one of the concentric wheels carries compass nomenclature and the other of the concentric wheels comprises a pointable hand indicating wind direction.

9. The pilot aid of claim 8 wherein the wheel that carries compass nomenclature is larger in diameter than the fixed position wheel and the fixed position wheel is larger in diameter than the pointable hand.

10. A pilot aid comprising:
    a sheet material having indicia thereon indicative of a plurality of predetermined flying parameters including at least wind velocity and direction;
    the sheet material including separate layers;
    a plurality of indicia wheels each separately mounted from said sheet material between the separate layers and each associated with a different flying parameter; and
    a plurality of dial members, each disposed over an indicia wheel and including a hand that is rotatable relative to the dial member and that can be pointed to nomenclature on the sheet material.

11. The pilot aid of claim 10 including a plurality of windows on said sheet material, each positioned to overly a corresponding indicia wheel and each for observing one of a plurality of predetermined characteristics that define the flying parameter.

12. The pilot aid of claim 11 wherein the indicia wheel and dial member are supported by a rivet means.

13. The pilot aid of claim 10 wherein the dial members are transparent so that the nomenclature on the sheet material can be read.

14. The pilot aid of claim 13 wherein one of the indicia wheels comprises a pair of concentrically disposed wheels, and further including a fixed position wheel between and concentric with the pair of concentric wheels and having a window for observing one of said plurality of predetermined flying parameters.

15. The pilot aid of claim 10 wherein the indicia wheel and dial member are concentrically supported for rotation.

16. The pilot aid of claim 10 including a pair of windows associated with one indicia wheel.

17. A pilot aid comprising:
a sheet material having indicia thereon indicative of a plurality of predetermined flying parameters including at least wind velocity and direction;
a plurality of indicia wheel means each separately mounted from said sheet material and each associated with a different flying parameter; and
wherein one of the indicia wheel means comprises a pair of concentrically disposed wheels;
further including a fixed position wheel between and concentric with the pair of concentric wheels and having a window for observing one of said plurality of predetermined flying parameters.

18. The pilot aid of claim 17 including a plurality of windows on said sheet material, each positioned to overly a corresponding indicia wheel and each for observing one of a plurality of predetermined characteristics that define the flying parameter.

19. The pilot aid of claim 18 including a plurality of dial members, each disposed over an indicia wheel and including a hand that can be pointed to nomenclature on the sheet material.

20. A pilot aid comprising:
a sheet material having indicia thereon indicative of a plurality of predetermined flying parameters including at least wind velocity and direction;
a plurality of indicia wheel means each separately mounted from said sheet material and each associated with a different flying parameter;
wherein one of the indicia wheel means comprises a pair of concentrically disposed wheels; and
further including a fixed position wheel between the pair of concentric wheels and having a window for observing indicia of runway number.

21. The pilot aid of claim 20 wherein one of the concentric wheels carries both compass nomenclature and runway number and the other of the concentric wheels comprises a pointable hand indicating wind direction.

22. The pilot aid of claim 21 wherein the wheel that carries compass nomenclature is larger in diameter than the fixed position wheel and the fixed position wheel is larger in diameter than the pointable hand.

\* \* \* \* \*